(12) United States Patent
Sekiyama (10) Patent No.: US 10,305,351 B2
(45) Date of Patent: May 28, 2019

(54) ROTATING ELECTRICAL MACHINE FOR VEHICLE

(71) Applicant: DENSO CORPORATION, Kariya, Aichi-pref. (JP)

(72) Inventor: Yosuke Sekiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 309 days.

(21) Appl. No.: 15/415,354

(22) Filed: Jan. 25, 2017

(65) Prior Publication Data

US 2017/0222519 A1 Aug. 3, 2017

(30) Foreign Application Priority Data

Jan. 28, 2016 (JP) .................. 2016-014249

(51) Int. Cl.
| | |
|---|---|
| *H02K 9/06* | (2006.01) |
| *B60L 1/00* | (2006.01) |
| *H02K 5/18* | (2006.01) |
| *H02K 11/04* | (2016.01) |
| *B60K 25/02* | (2006.01) |
| *H02K 5/20* | (2006.01) |
| *B60K 11/06* | (2006.01) |
| *B60K 1/00* | (2006.01) |

(52) U.S. Cl.
CPC .................. *H02K 9/06* (2013.01); *B60L 1/00* (2013.01); *H02K 5/18* (2013.01); *H02K 11/046* (2013.01); *B60K 11/06* (2013.01); *B60K 25/02* (2013.01); *B60K 2001/006* (2013.01); *B60K 2025/022* (2013.01); *B60L 2220/50* (2013.01); *B60Y 2400/604* (2013.01); *H02K 5/20* (2013.01); *Y02T 10/641* (2013.01)

(58) Field of Classification Search
CPC .......... H02K 9/02; H02K 9/06; H02K 11/048; H02K 5/15; H02K 5/20
See application file for complete search history.

(56) References Cited

U.S. PATENT DOCUMENTS

| | | | | |
|---|---|---|---|---|
| 3,717,779 | A * | 2/1973 | Hallerback | H02K 5/15 310/90 |
| 6,087,746 | A * | 7/2000 | Couvert | H02K 9/06 310/54 |
| 6,734,587 | B2 * | 5/2004 | Hirsou | H02K 5/15 310/52 |
| 6,933,635 | B2 * | 8/2005 | Kurahashi | H02K 11/046 310/64 |
| 2003/0020338 | A1 | 1/2003 | Hirsou et al. | |
| 2004/0000817 | A1 | 1/2004 | Hirsou et al. | |
| 2010/0013331 | A1 * | 1/2010 | Yoshida | H02K 5/20 310/64 |

* cited by examiner

*Primary Examiner* — Dang D Le
(74) *Attorney, Agent, or Firm* — Oliff PLC (57) ABSTRACT

An AC generator for a vehicle includes a housing having an inlet and an outlet, a stator fixed to the housing, a rotor disposed inside of the stator, a cooling fan fixed to a rotor, one or more cooling fins disposed in an air flow passage of a cooling air, and a rectifying element for rectifying an AC voltage generated by a stator winding. A positive-side cooling fin has a plurality of tapered first and second cooling holes penetrating in a thickness direction and serves as the air flow passages of the cooling air. Tapering directions of tapered surfaces extending in the thickness direction of each cooling hole in at least one pair of adjacent first and second cooling holes are reversed in the thickness direction with respect to each other.

12 Claims, 7 Drawing Sheets

ROTATING ELECTRICAL MACHINE FOR VEHICLE

CROSS-REFERENCE TO RELATED APPLICATION

This application is based on and claims the benefit of priority from earlier Japanese Patent Application No. 2016-14249 filed Jan. 28, 2016, the description of which is incorporated herein by reference.

TECHNICAL FIELD

The present disclosure relates to a rotating electrical machine for a vehicle mounted on a vehicle such as an automobile or a truck, and is used as an electric motor, a generator, or a generator motor.

BACKGROUND

An AC generator having an armature coil and a field coil is generally known as one type of conventional rotating electrical machine for a vehicle.

The AC generator includes a rectifier having a rectifying element for rectifying an AC voltage formed by the armature coil, and a cooling fin to which the rectifying element is fixed.

The cooling air is generated by a cooling fan, which is fixed to a rotor of the AC generator and rotates integrally therewith, and while being introduced into a generator housing through inlets disposed in a rear end wall of the generator housing, the cooling air is brought into contact with the rectifying element and the cooling fin.

Then, the cooling air is discharged to an outside from outlets disposed in a peripheral wall of the generator housing after cooling an interior of the generator housing.

With respect to the cooling fin, Japanese Patent No. 4180385 discloses a technology in which a large number of cooling holes penetrating in an axial direction are provided in the cooling fin to form cooling air flow passages in the axial direction so that the cooling performance can be improved.

Since these cooling holes are normally formed by casting, a draft angle of a mold for forming a cooling hole is required, so that a cooling hole is formed into a tapered shape.

In recent years, the above-mentioned rotating electrical machine for the vehicle is desired to be small in size and high in output, and in order to cope with an increase in heat generation accompanying an improvement in output, improvement in cooling performance is required.

As a method for improving the cooling performance, although it is conceivable to improve capacities of the cooling fan and the cooling fin, improving the capacity of the cooling fan is undesirable as it involves an increase in noise.

Therefore, improvement of the cooling capacity of the cooling fin is required.

Figure 13:
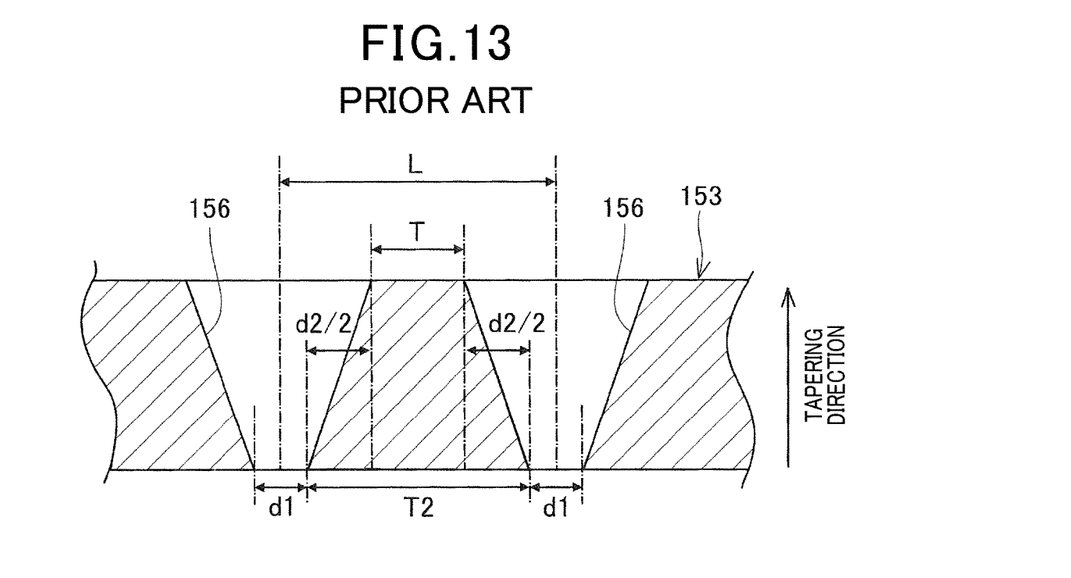
FIG. 13 shows a sectional view of a conventional cooling fin.

In such a case, as a method of improving the cooling capacity of the cooling fin with a limited fin space, the distance L between two adjacent cooling holes 156, 156 is shortened, as shown in FIG. 13, so that the number of the cooling holes 156 can be increased and the cooling holes 156 can be disposed densely.

However, a minimum wall thickness T between the two adjacent cooling holes 156, 156 is required to be equal to or more than a certain value in order to obtain the proper running property during casting and the strength of the cooling fin.

Further, on a surface of a cooling fin 153 opposite to a tapering direction (a bottom side in FIG. 13), a wall thickness T2 between the adjacent cooling holes 156, 156 increases more than necessary.

Therefore, it has been difficult to improve the cooling capacity by shortening the distance L between the cooling holes 156, 156 and by increasing the number of the cooling holes 156.

Further, since there is a difference in thickness between the cooling holes 156, 156 depending on positions in the thickness direction in the conventional cooling fin 153, there is a difference in strength.

In addition, since the rotating electrical machine is usually mounted at a position close to an engine of the vehicle, the cooling fin 153 receives a large exciting force due to engine vibration.

For this reason, the concentration of stress due to the difference in strength in the thickness direction of the cooling fin 153 cannot be ignored.

Therefore, there is a problem that a minimum wall thickness T must be taken large in order to obtain necessary strength.

SUMMARY

An embodiment provides a rotating electrical machine for a vehicle that can improve cooling capacity while securing necessary strength of a cooling fin.

A rotating electrical machine for a vehicle in a first aspect includes a housing having an inlet disposed in a rear end wall thereof and an outlet disposed in a peripheral wall thereof, a stator having a stator winding and fixed to the housing, a rotor disposed rotatably inwardly in the stator in a radial direction, a cooling fan fixed to the rotor and discharges cooling air drawn into the housing from the inlet to an outside via the outlet, one or more cooling fins disposed in an air flow passage of the cooling air, and a rectifying element for rectifying an AC voltage generated by the stator winding.

At least one of the cooling fins has a plurality of tapered cooling holes penetrating in a thickness direction and serves as the air flow passage of the cooling air, and tapering directions of tapered surfaces having the longest lengths in the thickness direction of the cooling holes in at least one pair of adjacent cooling holes are reversed in the thickness direction with respect to each other.

It should be noted that in the present disclosure, a tapering direction of a cooling hole means a direction in which a mold for forming the cooling hole is removed in forming the cooling hole by casting, and a direction from a small-diameter side toward a large-diameter side of a tapered shape.

According to the present configuration, the cooling fin has a plurality of tapered cooling holes penetrating in the thickness direction that serve as air flow passages of the cooling air, and the tapering directions of the tapered surfaces having the longest lengths in the thickness direction of the cooling holes in at least one pair of adjacent cooling holes are reversed in the thickness direction with respect to each other.

Thereby, it becomes possible to reduce an increase in wall thickness between the cooling holes due to the tapered shape of the cooling hole.

Further, since the wall thickness between the cooling holes can be made uniform, it is possible to reduce the minimum-wall-thickness between the cooling holes by an amount corresponding to the strength improved by uniformization.

Therefore, since the distance between the cooling holes can be shortened, it is possible to set a large number of cooling holes per unit space.

As a result, it is possible to improve the cooling capacity while obtaining the proper running property during casting and the strength of the cooling fin.

DETAILED DESCRIPTION OF THE PREFERRED EMBODIMENTS

Hereinafter, embodiments of a rotating electrical machine for a vehicle of the present disclosure will be specifically described with reference to the drawings.

First Embodiment

A rotating electrical machine for a vehicle according to a first embodiment of the present disclosure will be described with reference to FIGS. 1 to 4.

The rotating electrical machine for the vehicle of the first embodiment is one in which the present disclosure is applied to an AC generator for a vehicle 1 (hereinafter, simplified to an AC generator 1) mounted on a vehicle and used as a generator.

Figure 1:
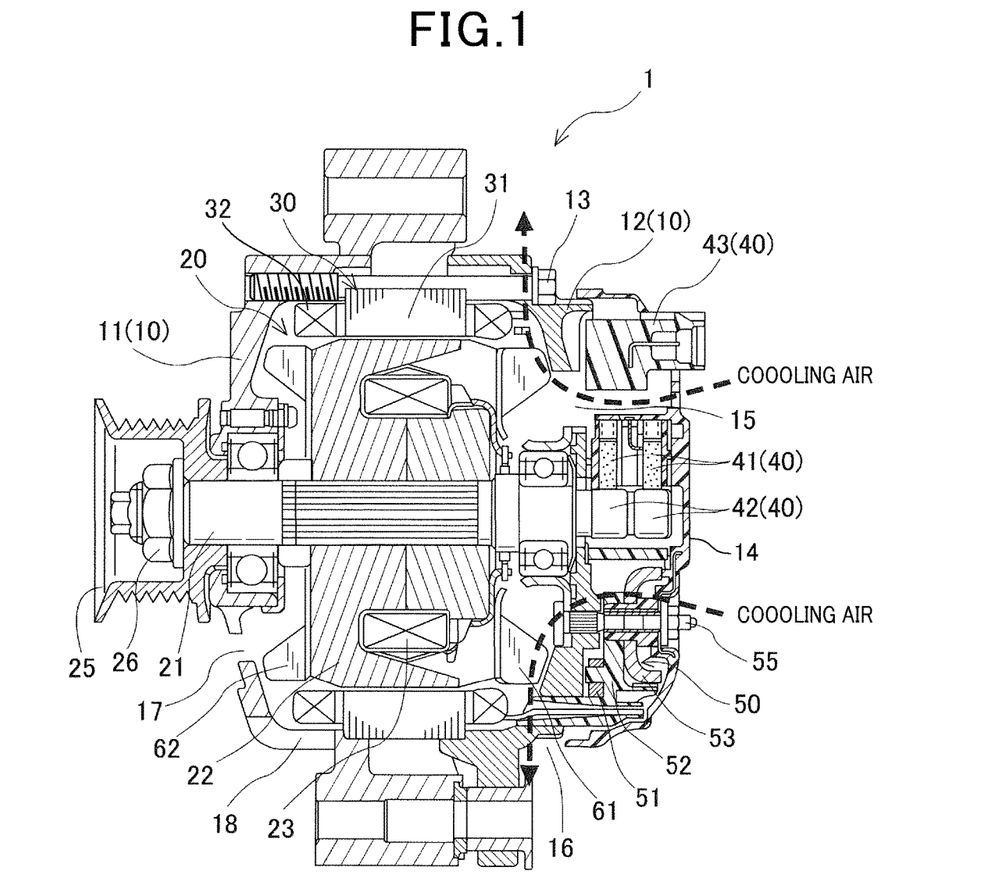
FIG. 1 shows an axial sectional view of a rotating electrical machine for a vehicle according to a first embodiment.

As shown in FIG. 1, the AC generator 1 includes a housing 10, a rotor 20, a stator 30, a field coil power supply mechanism 40, a rectifier 50, a rear-side cooling fan 61, a front-side cooling fan 62, and the like.

The housing 10 is composed of a bottomed cylindrical front housing 11 and a rear housing 12, each of which is open at one end.

The front housing 11 and the rear housing 12 are fastened by bolts 13 in a state where the openings are joined to each other.

The rotor 20 is disposed rotatably in the stator 30 inwardly in a radial direction, and is disposed integrally and rotatably on an outer periphery of a rotating shaft 21 supported rotatably by the housing 10.

The rotor 20 is a Lundell type rotor and has a pair of pole cores 22 and a field coil 23, and is driven to rotate by an engine (not shown) mounted on the vehicle.

The stator 30 has an annular stator core 31 and a stator winding 32 that is wound around the stator core 31.

The stator 30 is fixed to inner peripheral surfaces of the peripheral walls of the front housing 11 and the rear housing 12 in a state of being sandwiched in an axial direction.

The field coil power supply mechanism 40 is a device for supplying power to the field coil 23, and includes a pair of brushes 41, a pair of slip rings 42, a regulator 43, and the like.

The rectifier 50 is a device for rectifying an alternating current outputted from the stator winding 32.

The rectifier 50 includes a negative side cooling fin 51, a terminal block 52 and a positive side cooling fin 53 which are stacked in the axial direction, negative side diodes (rectifying elements; not shown) press-fitted in holes of the negative side cooling fin 51, and positive side diodes (rectifying elements) 54 press-fitted into other holes of the positive side cooling fin 53.

The negative side cooling fin 51, the terminal block 52 and the positive side cooling fin 53 are disposed so as to be aligned axially and fastened to an axially rear side of the rear end wall of the rear housing 12 with bolts 55.

The negative side cooling fin 51 also serves as a ground electrode of the rectifier 50, and the positive side cooling fin 53 also serves as a positive side output terminal of the rectifier 50.

Two three-phase diodes are fixed to the negative side cooling fin 51 and the positive side cooling fin 53, respectively.

An AC side terminal of each diode is connected to one of phase terminal wires of each phase extending from the stator winding 32 at the terminal block 52.

The rear-side cooling fan 61 is fixed to a rear end face of the rotor 20, and the front-side cooling fan 62 is fixed to a front end face of the rotor 20.

Inlets 15A of cooling air are disposed in the rear end wall of the rear housing 12, and outlets 16 is disposed opening to the peripheral wall of the rear housing 12 on a radially outer side of the rear-side cooling fan 61.

Accordingly, when the rear-side cooling fan 61 rotates, the cooling air that is drawn into the rear housing 12 from the inlets 15 and discharged to the outside of the rear housing 12 from the outlets 16 is generated.

Note that the negative side cooling fin 51 and the positive side cooling fin 53 are disposed on air flow passages of the cooling air generated by the rear-side cooling fan 61.

Similar to these inlets 15 and the outlets 16, the front housing 11 is also provided with inlets 17 and outlets 18 for the front-side cooling fan 62.

A pulley 25 rotating together with the rotor 20 is fixed by a nut 26 at a front end of the rotating shaft 21.

The rear end wall of the rear housing 12 is covered with a resin cover 14, and the field coil power supply mechanism 40 and the rectifier 50 are accommodated inside the resin cover 14.

Next, the characteristic parts of the AC generator 1 of the first embodiment of the present disclosure will be described with reference to FIGS. 2 to 4.

Figure 2:
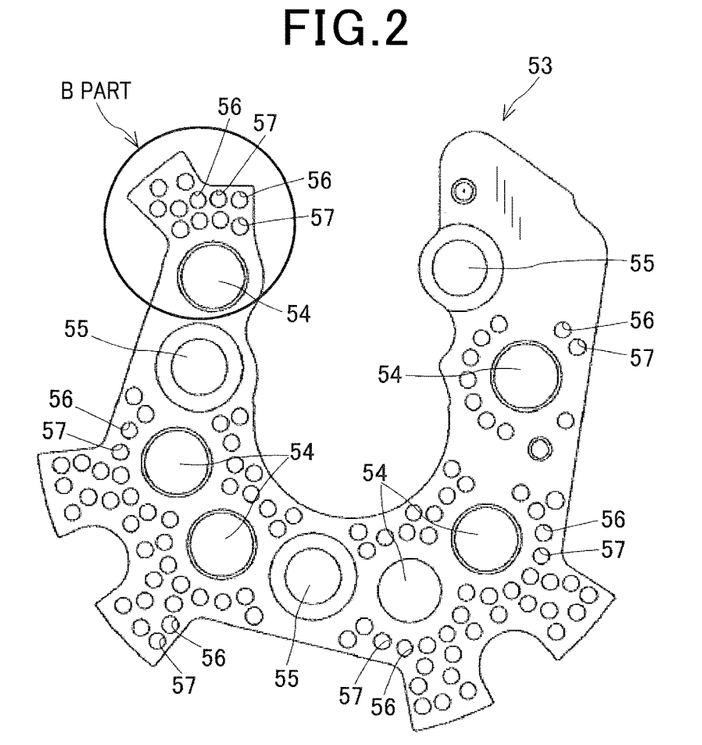
FIG. 2 shows a front view of a cooling fin as viewed from a thickness direction according to the first embodiment.
Figure 3:
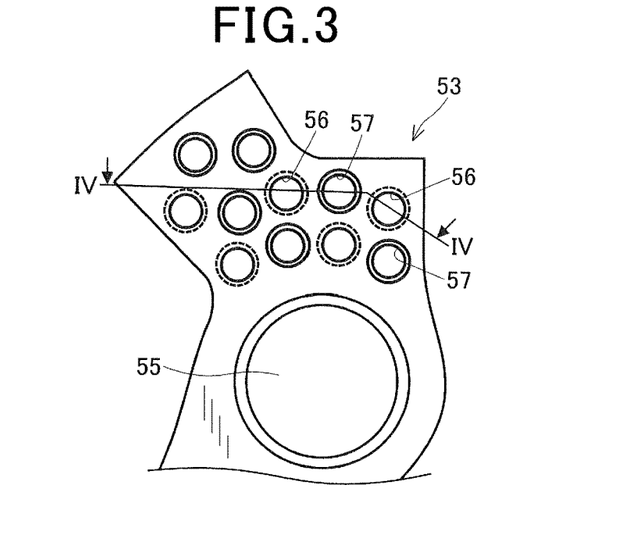
FIG. 3 shows a partial front view of an enlarged B part in FIG. 2.
Figure 4:
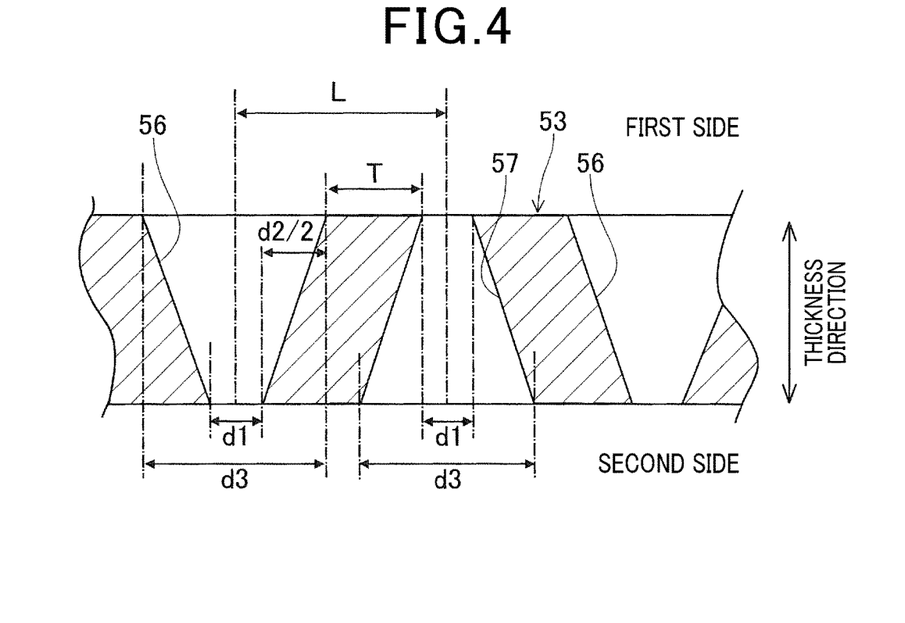
FIG. 4 shows a sectional view taken along a line IV-IV of FIG. 3.

As shown in FIGS. 2 to 4, the positive side cooling fin 53 of the rectifier 50 is formed into a horseshoe-shaped plate by casting, and has a plurality of tapered first and second cooling holes 56, 57 which serve as air flow passages for cooling air formed by the rear-side cooling fan 61.

The first and second cooling holes pass through the positive side cooling fin 53 in a thickness direction (axial direction).

The first and second cooling holes 56, 57 are formed by tapered cooling hole forming molds projecting from a molding surface of a mold (not shown) when forming the positive side cooling fin 53 by casting.

In this case, tapering directions of tapered surfaces extending in the thickness direction of the first cooling hole 56 and the second cooling hole 57 in at least one pair of adjacent first and second cooling holes 56, 57 are reversed in the thickness direction with respect to each other.

That is, the first cooling hole 56 has a tapered surface that tapers from a surface on a first side in the thickness direction of the positive-side cooling fin 53 (the upper side in FIG. 4) toward another surface on a second side (the lower side in FIG. 4).

In addition, the second cooling hole 57 has a tapered surface that tapers from the surface on the second side in the thickness direction of the positive-side cooling fin 53 toward the surface on the first side.

It should be noted that the tapering directions of the first and second cooling holes 56, 57 are directions in which the cooling hole forming molds are removed when the first and second cooling holes 56, 57 are formed by casting, and directions in which a tapered surface lies from a small diameter side to a large diameter side.

Therefore, in the case of the first embodiment, the tapered surfaces of the first cooling holes 56 are formed by the cooling hole forming molds of the mold which is pulled out to the first side in the thickness direction of the positive side cooling fin 53, and the tapered surfaces of the second cooling holes 57 are formed by the cooling hole forming molds of the mold which is pulled out to the second side in the thickness direction of the positive side cooling fin 53.

Here, as shown in FIG. 4, a distance L between two adjacent first cooling hole 56 and second cooling hole 57 can be obtained from the following equation 1 when diameters of small diameter side end parts of the first and second cooling holes 56, 57 are d1, a wall-thickness-increased-width from the diameter of the small diameter side end part of the first and second cooling holes 56, 57 to the diameter of the large diameter side end part is d2, and a minimum wall-thickness between the first and second cooling holes 56, 57 is T.

Further, in the case of a conventional example shown in FIG. 13, a distance L between two adjacent cooling holes 156, 156 can be obtained from the following equation 2.

Note that the distance L between the two adjacent cooling holes 56, 57, 156 is a distance between the central axes of the cooling holes.

$$L=(d1/2)+(d2/2)+T+(d1/2)=d1+(d2/2)+T \quad \text{Equation 1}$$

$$L=(d1/2)+(d2/2)+T+(d2/2)+(d1/2)=d1+d2+T \quad \text{Equation 2}$$

As can be seen from the above equations 1 and 2, in the case of the first embodiment, since the wall-thickness-increased-width d2 due to the tapered shape is reduced by half compared with the conventional example, the distance L between the two adjacent first and second cooling holes 56, 57 can be shortened.

Thereby, it becomes possible to increase the number of the first and second cooling holes 56, 57 and to dispose them more densely, the cooling capacity of the positive side cooling fin 53 can be increased.

In addition, since the tapering directions of tapered surfaces extending in the thickness direction of the adjacent first cooling hole 56 and the second cooling hole 57 are reversed in the thickness direction with respect to each other, the wall thickness between the first and second cooling holes 56, 57 can be made uniform.

Therefore, the minimum-wall-thickness T between the first and second cooling holes 56, 57 can be reduced by an amount corresponding to the strength improved by uniformization.

Note that in a case of first embodiment, the first cooling hole 56 and the second cooling hole 57 have a circular sectional shape in a plane orthogonal to the thickness direction (refer to FIG. 3), and a size of the sectional shape in the thickness direction are the same and made uniform (refer to FIG. 4).

Therefore, the diameters d1 of the small diameter side end parts of the first and second cooling holes 56, 57 are the same as diameters d3 of the large diameter side end parts.

When a rotational force from the engine is transmitted to the pulley 25 via a belt or the like (not shown), the rotor 20 is rotated in a predetermined direction together with the rotary shaft 21 in the AC generator 1 according to the first embodiment configured as described above.

In this state, by applying an excitation voltage from the brushes 41 to the field coil 23 of the rotor 20 via the slip rings 42, each claw-like magnetic pole portion of the pair of pole cores 22 is excited and the NS magnetic poles are alternately formed along a rotating direction of the rotor 20.

Thereby, a three-phase AC voltage can be generated in the stator winding 32, and a predetermined DC current can be taken out from the output terminal of the rectifier 50.

In addition, when the AC generator 1 operates and the rotor 20 rotates together with the rotary shaft 21 as described above, the front-side cooling fan 62 and the rear-side cooling fan 61 rotate simultaneously to generate the cooling air.

At this time, the rear-side cooling fan 61 generates the cooling air that flows into the housing 10 from the inlets 15 and discharges to the outside from the outlets 16 (refer to FIG. 1).

Note that the cooling air flows from holes disposed in the resin cover 14 or between the resin cover 14 and the rear housing 12 toward the inlets 15 positioned in the resin cover 14.

Thereby, the cooling air flowing into the resin cover 14 flows through the first and second cooling holes 56, 57 of the positive-side cooling fin 53 disposed in the resin cover 14 to cool the positive-side cooling fin 53.

At this time, since the tapering directions of tapered surfaces of the first cooling hole 56 and the second cooling hole 57 are reversed in the thickness direction with respect to each other, the wall thickness between the first and second cooling holes 56, 57 are made uniform.

Therefore, the minimum-wall-thickness T between the first and second cooling holes 56, 57 are reduced by the amount corresponding to the strength improved by uniformization.

Therefore, since the distance L between the first and second cooling holes 56, 57 can be shortened, the number of the first and second cooling holes 56, 57 per unit space can be set to a large number.

As a result, it is possible to improve the cooling capacity while obtaining the proper running property during casting and the strength of the positive-side cooling fin 53.

As described above, according to the AC generator 1 of the first embodiment, the positive-side cooling fin 53 has a plurality of tapered first and second cooling holes 56, 57 that penetrate in the thickness direction and serve as air flow passages of the cooling air.

Further, the tapering directions of the tapered surfaces extending in the thickness direction of each cooling holes 56, 57 in at least one pair of adjacent first and second cooling holes 56, 57 are reversed in the thickness direction with respect to each other.

Therefore, it is possible to improve the cooling capacity while obtaining the proper running property during casting and the strength of the positive-side cooling fin 53.

In addition, the sectional shapes in the thickness direction of the first and second cooling holes 56, 57 of the first embodiment are the same and are made uniform.

As a result, it is easy to manufacture the mold by casting, and the running cost of the mold can be reduced.

In addition, the sectional shapes in the plane orthogonal to the thickness direction of the first and second cooling holes 56, 57 of the first embodiment are circular.

As a result, when manufacturing the positive-side cooling fin 53 by casting, damage to the mold can be reduced, so that it is possible to improve the mold life.

It should be noted that the sectional shapes of the first and second cooling holes 56, 57 in the plane orthogonal to the thickness direction are not necessarily the circular shapes of a perfect circle, but may be an elliptical shape.

Second Embodiment

Figure 5:
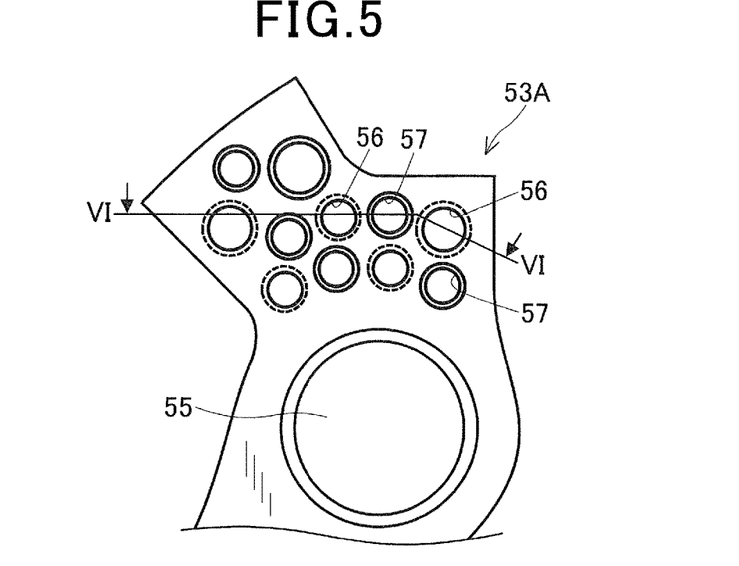
FIG. 5 shows a partial front view of a part of a cooling fin as viewed from the thickness direction according to a second embodiment.
Figure 6:
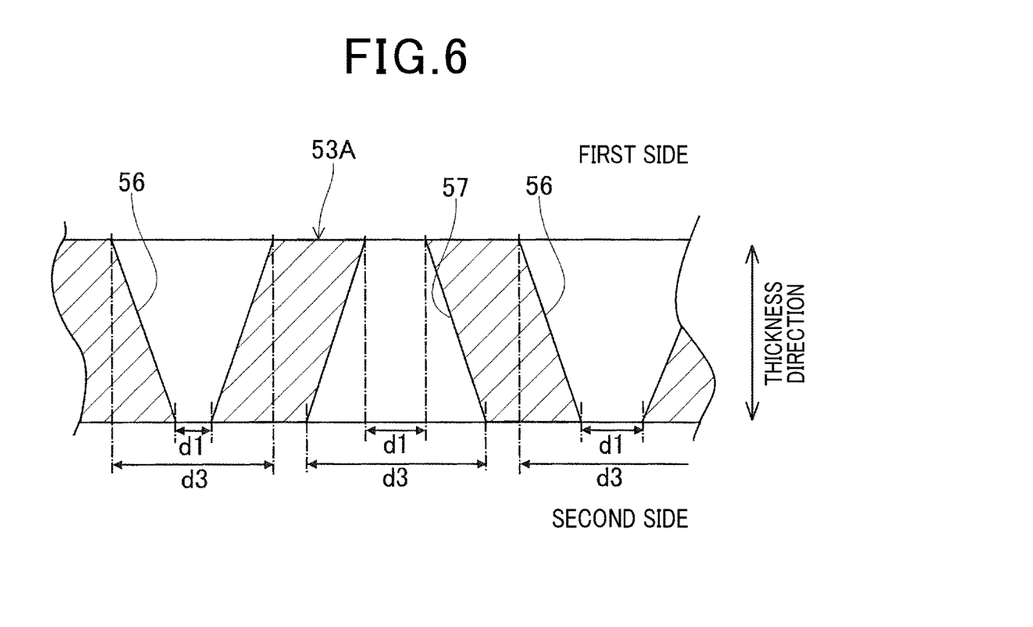
FIG. 6 shows a sectional view taken along a line VI-VI of FIG. 5.

A second embodiment of the present disclosure will be described with reference to FIGS. 5 and 6.

The sectional shapes in the thickness direction of the first and second cooling holes 56, 57 in the first embodiment described above are formed in the same size and are made uniform, whereas sectional shapes in the thickness direction of first and second cooling holes 56A, 57A in the second embodiment are made non-uniform in the size.

That is, similarly to the first embodiment, the first and second cooling holes 56A, 57A of the second embodiment have circular sectional shapes in a plane orthogonal to the thickness direction.

However, diameters d1 of small diameter side end parts and diameters d3 of large diameter side end parts of the cooling holes 56A, 57A are different from each other.

According to the second embodiment, the same functions and effects as those of the first embodiment can be obtained.

Furthermore, since the sizes of the first and second cooling holes 56A, 57A are made non-uniform, it is possible to suppress a dead space from occurring within a cooling hole disposing space of a positive side cooling fin 53A.

Therefore, the first and second cooling holes 56A, 57A can be disposed more efficiently and densely.

Third Embodiment

Figure 7:
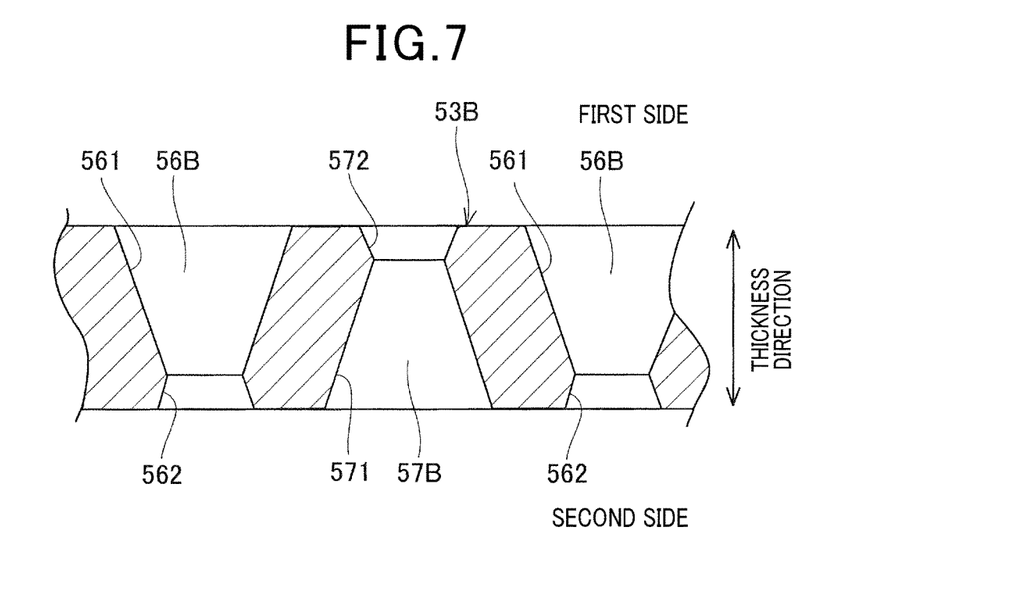
FIG. 7 shows a sectional view of a cooling fin corresponding to FIG. 4 according to a third embodiment.

A third embodiment of the present disclosure will be described with reference to FIG. 7.

Each of the first and second cooling holes 56, 57 in the first embodiment has one tapered surface.

On the other hand, first and second cooling holes 56B, 57B of the third embodiment are different from the first embodiment that they have first tapered surfaces 561 and 571 and second tapered surfaces 562 and 572, respectively, of which tapering directions are reversed to each other.

That is, each of the first cooling holes 56B has a first tapered surface 561 that tapers from a surface on a first side in the thickness direction (upper side in FIG. 7) of a positive side cooling fin 53B toward a surface on a second side (lower side in FIG. 7) and a second tapered surface 562 that tapers from the surface on the second side in the thickness direction of the positive side cooling fin 53B toward the surface on the first side.

In this case, the first tapered surface 561 is formed by a cooling hole forming mold of a mold which is pulled out to the first side in the thickness direction of the positive side cooling fin 53B, and the second tapered surface 562 is formed by a cooling hole forming mold of the mold which is pulled out to the second side in the thickness direction of the positive side cooling fin 53B.

Moreover, each of the second cooling holes 57B has a first tapered surface 571 that tapers from the surface on the second side in the thickness direction of a positive side cooling fin 53B toward the surface on the first side and a second tapered surface 572 that tapers from the surface on the first side in the thickness direction of the positive side cooling fin 53B toward the surface on the second side.

In this case, the first tapered surface 571 is formed by the cooling hole forming mold of the mold which is pulled out to the second side in the thickness direction of the positive side cooling fin 53B, and the second tapered surface 572 is formed by the cooling hole forming mold of the mold which is pulled out to the first side in the thickness direction of the positive side cooling fin 53B.

Then, the first tapered surface 561 of the first cooling hole 56B is longer in the thickness direction than the second tapered surface 562 and the first tapered surface 571 of the second cooling hole 57B is longer in the thickness direction than the second tapered surface 572.

Thereby, tapering directions of tapered surfaces 561, 571 that are the longest in the thickness direction of the first and the second cooling hole holes 56B, 57B in at least one pair of adjacent first and second cooling holes 56B, 57B are reversed in the thickness direction with respect to each other.

Note that although the first and second cooling holes 56B, 57B of the third embodiment have the same sectional sizes in the thickness direction and are made uniform, the sectional sizes of the first and second cooling holes 56B, 57B in the thickness direction may be made non-uniform as in the second embodiment.

As described above, according to the third embodiment, since the tapering directions of tapered surfaces 561, 571 that are the longest in the thickness direction of the first and the second cooling hole holes 56B, 57B in at least one pair of adjacent first and second cooling holes 56B, 57B are reversed in the thickness direction with respect to each other, the same functions and effects as those of the first embodiment can be obtained.

First Modification

Figure 8:
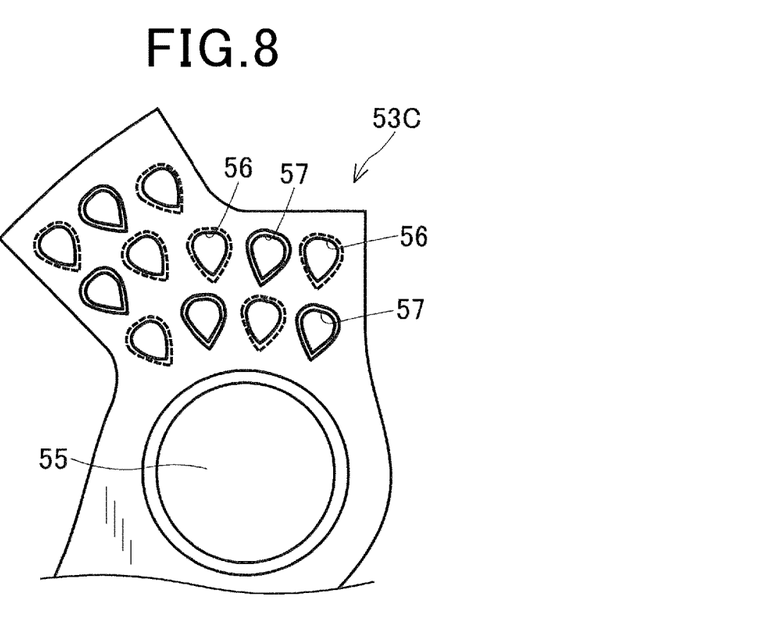
FIG. 8 shows a partial front view of a part of a cooling fin as viewed from the thickness direction according to a first modification.

A first modification of the present disclosure will be described with reference to FIG. 8.

The sectional shapes in the plane orthogonal to the thickness direction are circular in the first and the second cooling holes 56, 57 of the first embodiment.

On the other hand, first and second cooling holes 56C, 57C of a first modification are different in that one corner portion is formed among a shape in which the sectional shape has at least one corner portion.

Note that a portion other than one corner portion of the first and second cooling holes 56C, 57C is an arc-shaped curved surface.

According to the first modification, the degree of freedom of disposition of the first and second cooling holes 56C, 57C is improved as compared with a case where a sectional shape is circular or polygonal.

Therefore, it is possible to suppress a dead space from occurring within a cooling hole disposing space of a positive side cooling fin 53C, and the first and second cooling holes 56C, 57C can be disposed more efficiently and densely.

Note that in the case of the first modification, the sizes of the sectional shape in the thickness direction of the first and second cooling holes 56C, 57C may be made either uniform as in the first embodiment or non-uniform as in the second embodiment.

Second Modification

Figure 9:
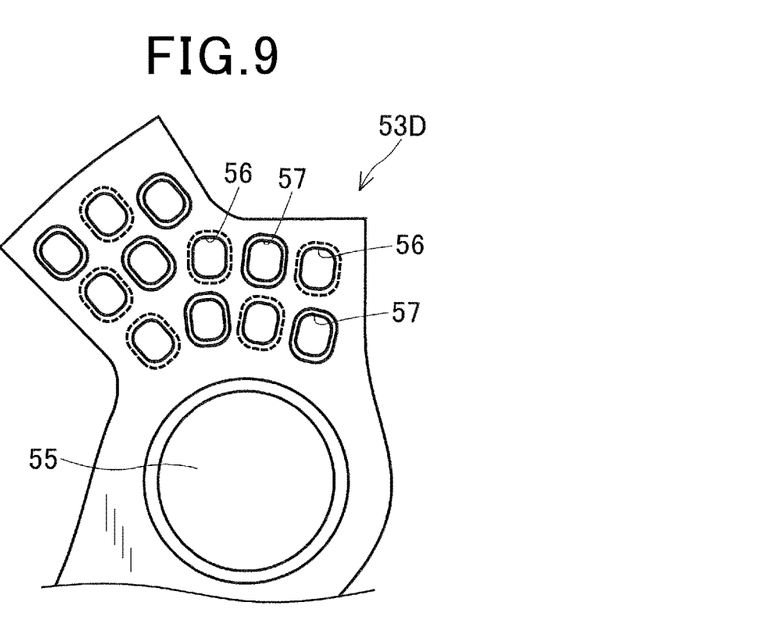
FIG. 9 shows a partial front view of a part of a cooling fin as viewed from the thickness direction according to a second modification.

A second modification of the present disclosure will be described with reference to FIG. 9.

The first and second cooling holes 56C, 57C of the first modification are formed to have one corner portion in the sectional shapes in the plane orthogonal to the thickness direction.

On the other hand, first and second cooling holes 56D, 57D of the second modification differ in that four corner portions are formed among a shape in which the sectional shape has at least one corner portion.

In addition, at the four corner portions of the first and second cooling holes 56D, 57D, a curved portion having a curvature radius larger than that of an arcuate curved portion inevitably formed during casting is positively disposed.

According to the second modification, since the sectional shapes of the first and second cooling holes 56D, 57D are a rounded polygon (quadrangle), circumferential lengths of the first and second cooling holes 56D, 57D are increased as compared with a case where the cooling holes have the same circular sectional area, so that heat radiating areas of the first and second cooling holes 56D, 57D can be increased.

Therefore, when manufacturing a positive side cooling fin 53D by casting, it is possible to improve the cooling performance while suppressing the mold from being damaged.

Even in the case of the second modification, the sizes of the sectional shape in the thickness direction of the first and second cooling holes 56D, 57D may be made either uniform as in the first embodiment or non-uniform as in the second embodiment.

Third Modification

Figure 10:
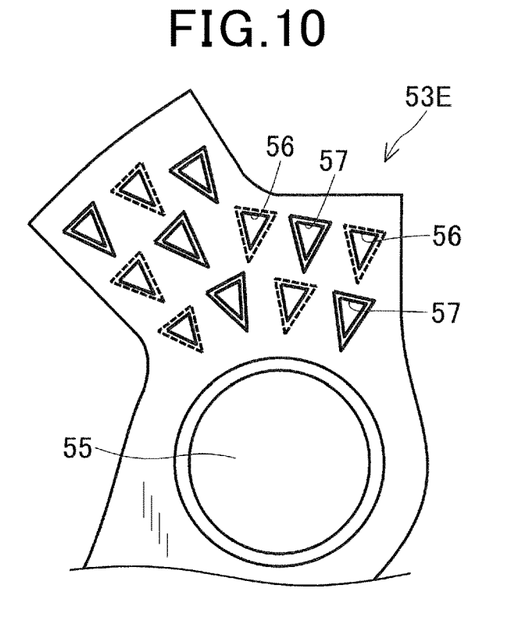
FIG. 10 shows a partial front view of a part of a cooling fin as viewed from the thickness direction according to a third modification.

A third modification of the present disclosure will be described with reference to FIG. 10.

The first and second cooling holes 56C, 57C of the first modification are formed to have one corner portion in the sectional shapes in the plane orthogonal to the thickness direction.

On the other hand, first and second cooling holes 56E, 57E of the third modification differ in that three corner portions are formed among a shape in which the sectional shape has at least one corner portion.

In addition, at the three corner portions of the first and second cooling holes 56E, 57E, a curved portion having a curvature radius larger than that of an arcuate curved portion inevitably formed during casting is positively disposed.

According to third modification, the sectional shapes of the first and second cooling holes 56E, 57E are polygonal (triangular).

As a result, circumferential lengths of the first and second cooling holes 56E, 57E are increased as compared with a case where the cooling holes have the same circular sectional area, so that heat radiating areas of the first and second cooling holes 56E, 57E can be increased.

Therefore, when manufacturing a positive side cooling fin 53E by casting, it is possible to improve the cooling performance while suppressing the mold from being damaged.

Even in the case of the third modification, the sizes of the sectional shape in the thickness direction of the first and second cooling holes 56E, 57E may be made either uniform as in the first embodiment or non-uniform as in the second embodiment.

Fourth Modification

Figure 11:
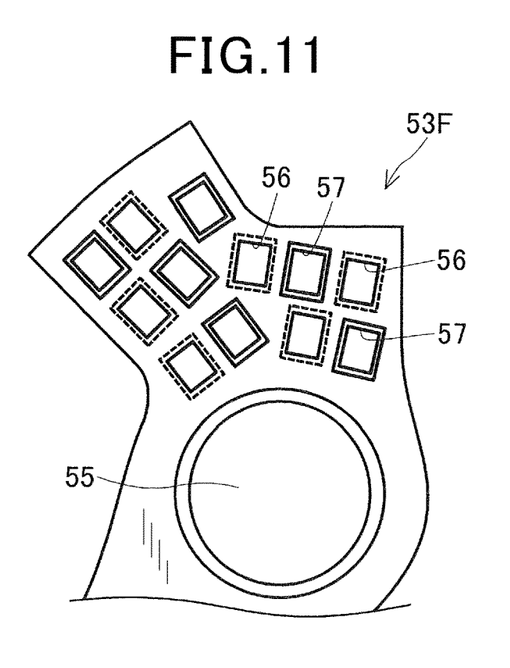
FIG. 11 shows a partial front view of a part of a cooling fin as viewed from the thickness direction according to a fourth modification.

A fourth modification of the present disclosure will be described with reference to FIG. 11.

The first and second cooling holes 56C, 57C of the first modification are formed to have one corner portion in the sectional shapes in the plane orthogonal to the thickness direction.

On the other hand, first and second cooling holes 56F, 57F of the third modification differ in that four corner portions are formed among a shape in which the sectional shape has at least one corner portion.

In addition, at the four corner portions of the first and second cooling holes 56F, 57F, arcuate curved portions having a small curvature radius inevitably formed during casting are formed.

According to fourth modification, the sectional shapes of the first and second cooling holes 56F, 57F are polygonal (quadrangular).

Accordingly, circumferential lengths of the first and second cooling holes 56F, 57F are increased as compared with a case where the cooling holes have the same circular sectional area, so that heat radiating areas of the first and second cooling holes 56F, 57F can be increased.

Therefore, when manufacturing a positive side cooling fin 53F by casting, it is possible to improve the cooling performance while suppressing the mold from being damaged.

Even in the case of the fourth modification, the sizes of the sectional shape in the thickness direction of the first and second cooling holes 56F, 57F may be made either uniform as in the first embodiment or non-uniform as in the second embodiment.

Fifth Modification

Figure 12:
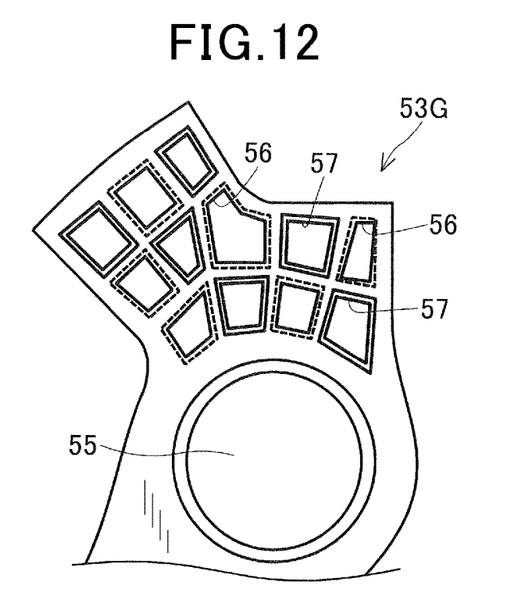
FIG. 12 shows a partial front view of a part of a cooling fin as viewed from the thickness direction according to a fifth modification.

A fifth modification of the present disclosure will be described with reference to FIG. 12.

The first and second cooling holes 56C, 57C of the first modification are formed to have one corner portion in the sectional shapes in the plane orthogonal to the thickness direction.

On the other hand, first and second cooling holes 56G, 57G of the fifth modification are different in that there are two or more sectional shapes.

In this case, the sectional shapes of the first and second cooling holes 56G, 57G are composed of a combination of trapeziums, irregularly shaped pentagons, and the like.

In addition, at each corner portion of the first and second cooling holes 56G, 57G, arcuate curved portions having a small curvature radius inevitably formed during casting are formed.

According to the fifth modification, the sectional shapes of the first and second cooling holes 56G, 57G are combined with two or more different sectional shapes.

Therefore, it is possible to suppress a dead space from occurring within a cooling hole disposing space of a positive side cooling fin 53G, and the first and second cooling holes 56G, 57G can be disposed more efficiently and densely.

Other Embodiments

The present disclosure is not limited to the above-described embodiments and modifications, and various modifications can be made without departing from the scope of the present disclosure.

For example, an example in which the first and second cooling holes 56, 57 are disposed only in the positive-side cooling fin 53 has been described in the above-described embodiments and modifications.

However, the first and second cooling holes 56, 57 may be disposed only in the negative side cooling fin 51 or in both of them.

Further, the negative side cooling fin 51 may not be disposed by fixing the negative side rectifying elements to the housing 10, and the first and second cooling holes 56, 57 may be disposed only in the positive side cooling fin 53.

What is claimed is:

1. A rotary electric machine for a vehicle comprising:
   a housing having an inlet disposed in a rear end wall thereof and an outlet disposed in a peripheral wall thereof;
   a stator having a stator winding and fixed to the housing;
   a rotor disposed rotatably inwardly in the stator in a radial direction;
   a cooling fan fixed to the rotor and discharges cooling air drawn into the housing from the inlet to an outside via the outlet;
   one or more cooling fins disposed in an air flow passage of the cooling air, and
   a rectifying element for rectifying an AC voltage generated by the stator winding; wherein,
   at least one of the cooling fins has a plurality of tapered cooling holes penetrating in a thickness direction and serves as the air flow passage of the cooling air; and
   tapering directions of tapered surfaces having the longest lengths in the thickness direction of the cooling holes in at least one pair of adjacent cooling holes are reversed in the thickness direction with respect to each other.

2. The rotating electrical machine for the vehicle according to claim 1, wherein,
   sectional shapes in the thickness direction of the cooling holes are made uniform.

3. The rotating electrical machine for the vehicle according to claim 2, wherein,
   the cooling hole has a circular or elliptical sectional shape in a plane orthogonal to the thickness direction.

4. The rotating electrical machine for the vehicle according to claim 2, wherein,
   the cooling hole has a shape in which a sectional shape in a plane orthogonal to the thickness direction has at least one corner portion.

5. The rotating electrical machine for the vehicle according to claim 2, wherein,
   the cooling hole has two or more sectional shapes in a plane orthogonal to the thickness direction.

6. The rotating electrical machine for the vehicle according to claim 1, wherein,
   sectional shapes in the thickness direction of the cooling holes are made non-uniform.

7. The rotating electrical machine for the vehicle according to claim 6, wherein,
   the cooling hole has a circular or elliptical sectional shape in a plane orthogonal to the thickness direction.

8. The rotating electrical machine for the vehicle according to claim 6, wherein,
   the cooling hole has a shape in which a sectional shape in a plane orthogonal to the thickness direction has at least one corner portion.

9. The rotating electrical machine for the vehicle according to claim 6, wherein,
   the cooling hole has two or more sectional shapes in a plane orthogonal to the thickness direction.

10. The rotating electrical machine for the vehicle according to claim 1, wherein,
    the cooling hole has a circular or elliptical sectional shape in a plane orthogonal to the thickness direction.

11. The rotating electrical machine for the vehicle according to claim 1, wherein,
    the cooling hole has a shape in which a sectional shape in a plane orthogonal to the thickness direction has at least one corner portion.

12. The rotating electrical machine for the vehicle according to claim 1, wherein,
    the cooling hole has two or more sectional shapes in a plane orthogonal to the thickness direction.

* * * * *